United States Patent
Sauter et al.

(10) Patent No.: US 6,253,142 B1
(45) Date of Patent: Jun. 26, 2001

(54) TRACTION CONTROL SYSTEM FOR MOTOR VEHICLES

(75) Inventors: Thomas Sauter, Remseck; Peter Daubner, Illingen, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 08/519,234

(22) Filed: Aug. 25, 1995

(30) Foreign Application Priority Data

Aug. 25, 1994 (DE) ................................. 44 30 108

(51) Int. Cl.$^7$ ....................................................... G06F 7/70
(52) U.S. Cl. .............................. 701/82; 701/71; 701/73; 701/80; 701/74; 180/197; 280/757; 280/707; 303/141; 303/110
(58) Field of Search ..................... 364/426.029, 426.01, 364/426.015, 426.017, 426.019, 426.025, 426.027, 426.028, 426.035, 426.036, 426.042; 180/197, 76; 123/332; 280/757, 707; 303/110, 113.2, 113.3, 103, 100, 141

(56) References Cited

U.S. PATENT DOCUMENTS

| 4,947,332 | * | 8/1990 | Ghoneim | 364/426.029 |
| 5,010,982 | * | 4/1991 | Sedlmayr | 280/757 |
| 5,018,595 | * | 5/1991 | Hara et al. | 364/426.01 |
| 5,090,511 | * | 2/1992 | Kabasin | 364/426.031 |
| 5,103,928 | | 4/1992 | Danner et al. | 180/197 |
| 5,320,422 | * | 6/1994 | Tsuyama et al. | 364/426.029 |
| 5,351,192 | * | 9/1994 | Tsuyama et al. | 364/426.029 |
| 5,373,447 | * | 12/1994 | Howes et al. | 364/426.029 |
| 5,394,329 | * | 2/1995 | Bridgens | 364/426.029 |
| 5,459,661 | * | 10/1995 | Yagi et al. | 364/426.031 |

FOREIGN PATENT DOCUMENTS

| 3938444 | 5/1991 | (DE) . |
| 4218034 | 12/1993 | (DE) . |
| 4338587 | 5/1994 | (DE) . |
| 4239711 | 6/1994 | (DE) . |
| 0444803 | 2/1991 | (EP) . |
| 8903780 | 5/1989 | (WO) . |

OTHER PUBLICATIONS

Bubb, Heiner, "Ein Verfahren zur Bestimmung des Kraftschlusses zwischen Rad und strasse während der Fahrt" Automobiltecnische Zeitschrift, 83 (1981) 1, pp.31–36, Jan. 1981.

* cited by examiner

Primary Examiner—Jacques H. Louis-Jacques
(74) Attorney, Agent, or Firm—Felfe & Lynch (57) ABSTRACT

The coefficient of friction $\mu_s$ between the wheels of the vehicle and the road surface is identified as a function of the slip, and the maximum drive torque MAmax which can be transmitted is determined as a function of this slip-dependent coefficient of friction $\lambda$. $\lambda$ is corrected when there is an increased slip requirement $\lambda_{erf}$ as a result of the speed of the vehicle and/or the tire mixture used.

13 Claims, 6 Drawing Sheets

TRACTION CONTROL SYSTEM FOR MOTOR VEHICLES

PRIOR ART

The invention relates to a traction control system.

Such a traction control system is known, for example, from DE 39 38 444 C1 to which U.S. Pat. No. 5,103,928 corresponds. In this publication, the maximum drive torque which can be transmitted by the driven wheels is determined and transmitted to a control device of the internal combustion engine. The said control device sets the torque, output by the internal combustion engine, in accordance with the calculated maximum drive torque which can be transmitted under the prevailing conditions. The maximum drive torque which can be transmitted is determined here from a term which is dependent on vehicle data and a term which is dependent on the difference between the desired slip and actual slip of the driven wheels of the vehicle. During the traction control, the calculated value of the maximum drive torque which can be transmitted is increased as a function of time in order to allow for the slip-dependent changes in the coefficient of friction and to get as near as possible to the real conditions. It is not proposed to take the coefficient of friction into account directly, and thus to determine the maximum drive torque which can be transmitted more accurately.

Therefore, the object of the invention is to specify measures which can be used to take into account directly the coefficient of friction between the driven wheels and the surface of the carriageway during traction control.

DE 42 39 711 A1 discloses a control system for a vehicle in which, for example, for traction control a desired engine torque is transmitted from a traction controller to a control system for the internal combustion engine, which desired engine torque is set by this control system. The control system of the internal combustion engine calculates the output engine torque and reports this back to the traction controller.

In the publication "Heiner Bubb, Ein Verfahren zur Bestimmung des Kraftschlusses zwischen Rad und Straße während der Fahrt (Heiner Bubb, A method for determining the grip between the wheel and the road while traveling), ATZ, Automombiltechnische Zeitschrift 83, 1981, 1, pp 31 to 36", the dependence of the coefficient of friction between the wheel and the surface of the carriageway on slip and on the speed of the vehicle is shown. Measures for taking into account this coefficient of friction during traction control are not described.

ADVANTAGES OF THE INVENTION

The procedure according to the invention has the advantage that a reliable determination of the coefficient of friction between the wheels of the vehicle and the surface of the carriageway is made available and this is taken into account when determining the maximum drive torque which can be transmitted. This has particular advantages when cornering in a bend with a low coefficient of friction (for example, a bend which is wet from rain), it being possible to reduce the engine torque suitably in particular even while entering the bend and when the vehicle begins to become unstable. This also applies to traveling straight ahead on carriageways with an average and low coefficient of friction.

It is particularly advantageous that the higher slip requirement at higher speeds and the changing slip requirement of different types of tires, for example winter tires or summer tires with a soft rubber mixture, are taken into account when identifying the coefficient.

DESCRIPTION OF EXEMPLARY EMBODIMENTS

Figure 1:
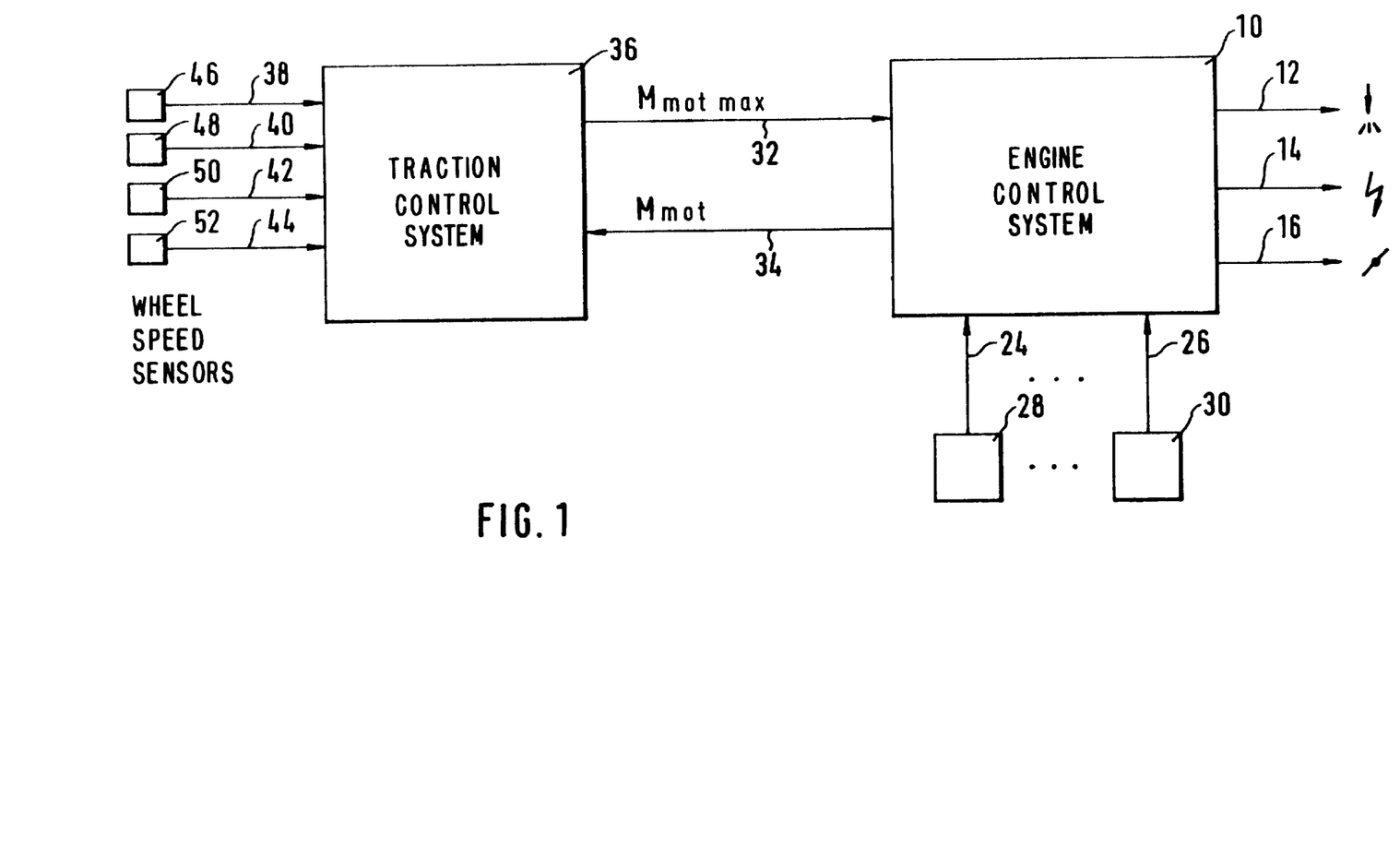
FIG. 1 shows an overview block diagram of a traction control system.

FIG. 1 shows an engine control system which influences the metering of fuel, the ignition angle and/or the supply of air to the internal combustion engine via the output lines 12, 14 and/or 16. In addition, input lines 24 to 26 are led from measuring devices 28 to 30 to the control system 10, which measuring devices 28 to 30 detect the operating variables, essential for control, of the internal combustion engine and/or vehicle. The engine control system 10 is connected to a traction controller 36 via the lines 32 and 34, which are part of a communication system. The input lines leading to the traction controller 36 are at least the input lines 38, 40, 42 and 44 of measuring devices 46, 48, 50 and 52 for detecting the speeds of revolution of the wheels of the vehicle, and, if appropriate, a line (not shown) from a steering angle sensor.

In the traction controller 36, the tendency of at least one drive wheel to slip is identified, in a manner known per se, as a function of the speeds of revolution of the wheels, and the maximum drive torque MAmax which can be transmitted is calculated. According to the invention, this maximum drive torque which can be transmitted is weighted both at the start of, and during, the traction control with the identified coefficient of friction and transmitted to the engine control system 10 as a desired torque value Mmotmax via the line 32. At the engine control system 10 the desired value determined by the traction control system 36 is set by correspondingly influencing the supply of air, by correcting the ignition angle and/or by suppressing individual injections. The engine torque which is output is calculated from operating variables of the internal combustion engine (e.g. engine speed and air flow) and transmitted to the traction controller 36 via the line 34. The result is a control of the drive slip to a prescribed desired value by influencing the engine torque of the internal combustion engine. In another advantageous exemplary embodiment, the engine torque which is output is derived from the value of the air flow rate.

In the publication mentioned at the beginning in the journal ATZ, basic investigations on the dependence of slip on the coefficient of friction are known. In this journal, the finding illustrated in FIG. 2a emerged that for a given coefficient of friction the relationship between the drive torque MA and slip $\lambda$ can be illustrated essentially as a straight line. Therefore, in FIG. 2a corresponding straight lines are entered for three coefficients of friction ($\mu$) by way of example. If the coefficient of friction $\mu$ is plotted, on the basis of this relationship, against the quotient of the drive torque MA and slip $\lambda$, a straight line (cf. FIG. 2b) is also obtained. This coefficient of friction is referred to below as the slip-dependent coefficient of friction $\mu s$, in contrast to the coefficient of friction which is designated below as the load-dependent coefficient of friction $\mu_L$ and which constitutes the coefficient of friction which is set by the engine, and thus by the driver, and is independent of slip. The load-dependent coefficient of friction $\mu_L$ is calculated from the quotient of the difference between the drive torque MA and the rotational acceleration resistance torque MWBR (corresponds essentially to the product of the moment of inertia and the acceleration) and the product of the vehicle-specific data (vertical force of the drive axle and wheel radius).

Figure 3:
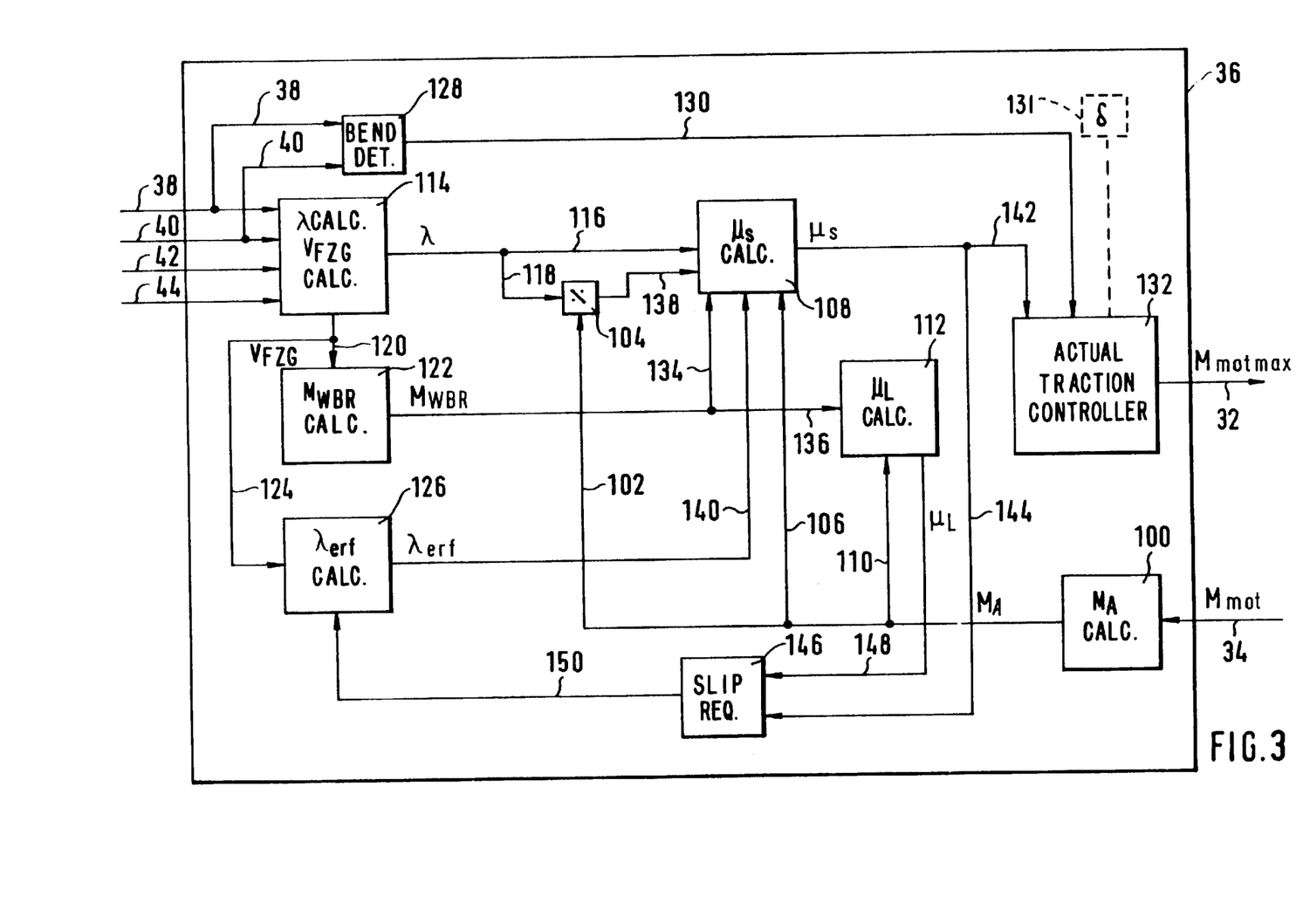
FIG. 3 is a block diagram of the traction controller.

FIG. 3 shows an overview block diagram of the traction controller 36 in order to illustrate the procedure according to the invention. The engine torque Mmot which is output and supplied via the line 34 is conducted to a first block 100 in which the engine torque is converted in the drive torque MA (for example MA=Mmot*overall transmission ratio*efficiency) taking into account the transmission ratios in the drive train and its efficiency. The calculated drive torque MA is transmitted to a division point 104 via the line 102, to the calculation block 108 for the slip-dependent coefficient of friction $\mu s$ via the line 106 and to the calculation block 112 for the load-dependent coefficient of friction $\mu s$ via the line 110. In addition, a block 114 is provided to which the lines 38, 40, 42 and 44 are led in order to estimate the average speed of the vehicle $V_{FIG}$ and to determine the average actual slip $\lambda$ at the driven wheels. The calculated slip value $\lambda$ is conducted to the calculation block 108 via the line 116 and to the division point 104 via the line 118. The average speed of the vehicle is conducted via the line 120 to a calculation block 122 for calculating the rotational acceleration resistance torque MWBR, and via a line 124 to the calculation block 126 for identifying the increased slip requirement $\lambda$erf. In addition, the speed of revolution signals of the nondriven wheels are conducted to a calculation block 128 on the lines 38 and 40, which calculation block 128 determines entry into a bend by reference to the difference between the two values. This information is transmitted by the calculation block 128 to the actual traction controller 132 via a line 130. A value which corresponds to the acceleration resistance torque MWBR is conducted from the calculation block 122 to the calculation unit 108 via the line 134 and to the calculation block 112 via the line 136. In the divider stage 104, the quotient of the drive torque MA and slip $\lambda$ is formed and conducted to the calculation block 108 via the line 138. In addition, the line 140, on which a measure of the increased slip requirement $\lambda$erf is transmitted, is also led to the calculation block 108. The slip-dependent coefficient of friction $\mu_s$ identified in the calculation block 108 is conducted to the actual traction controller 132 via the line 142 and to the calculation block 146 via the line 144. A measure of the load-dependent coefficient of friction $\mu_L$ is transmitted to the calculation block 146 on line 148. The calculation block 146 determines a slip requirement $\lambda_{erf}$ which is possibly increased as a result of the tires used, and transmits a corresponding signal to the calculation block 126 via the line 150. If a steering angle sensor 131 is provided, as an alternate to block 128 a corresponding line is led to the actual traction controller 132.

In a preferred exemplary embodiment, the traction controller 132 whose output line forms the line 32 carries out the control of the drive slip, with the maximum drive torque MAmax which can be transmitted, or the engine torque Mmot to be set, being specified. The elements necessary for this function are not illustrated in FIG. 3 for reasons of clarity. In addition, in a preferred exemplary embodiment, the traction controller 132 identifies a rebound in the torque (MA Mmot) before the traction control is initiated as a function of the slip-dependent coefficient of friction $\mu_s$ which is conducted via the line 142 when the vehicle is traveling straight ahead, when block 128 detects entry into a bend or when the vehicle is traveling around a bend.

Figure 2A:
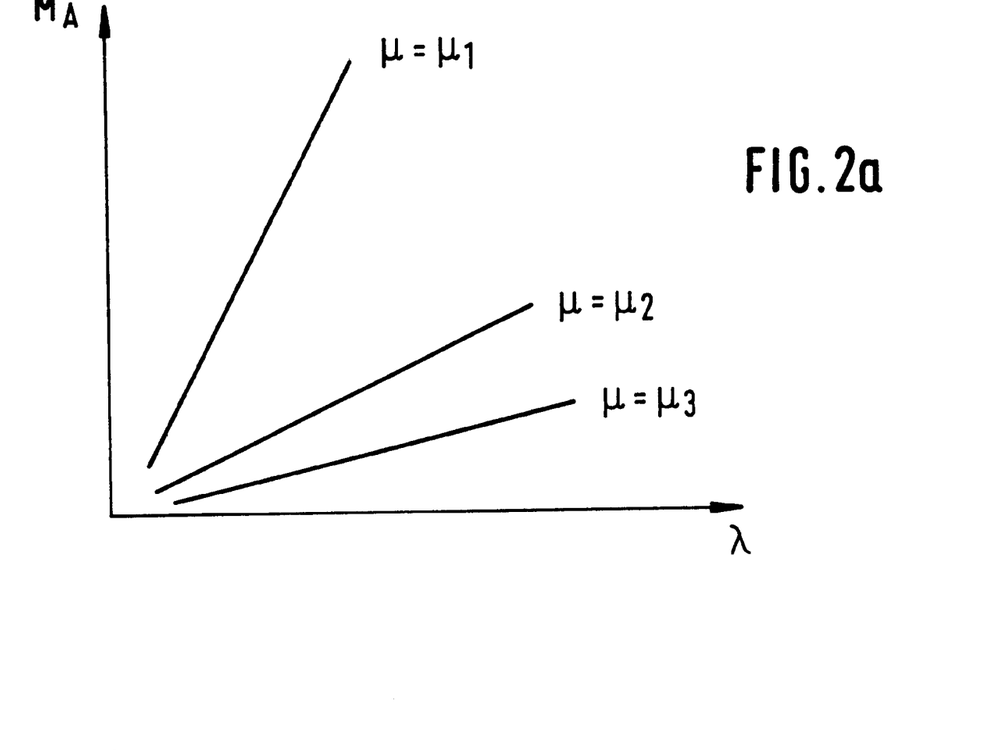
FIG. 2a is a plot of drive torque versus slip for different coefficients of friction.
Figure 2B:
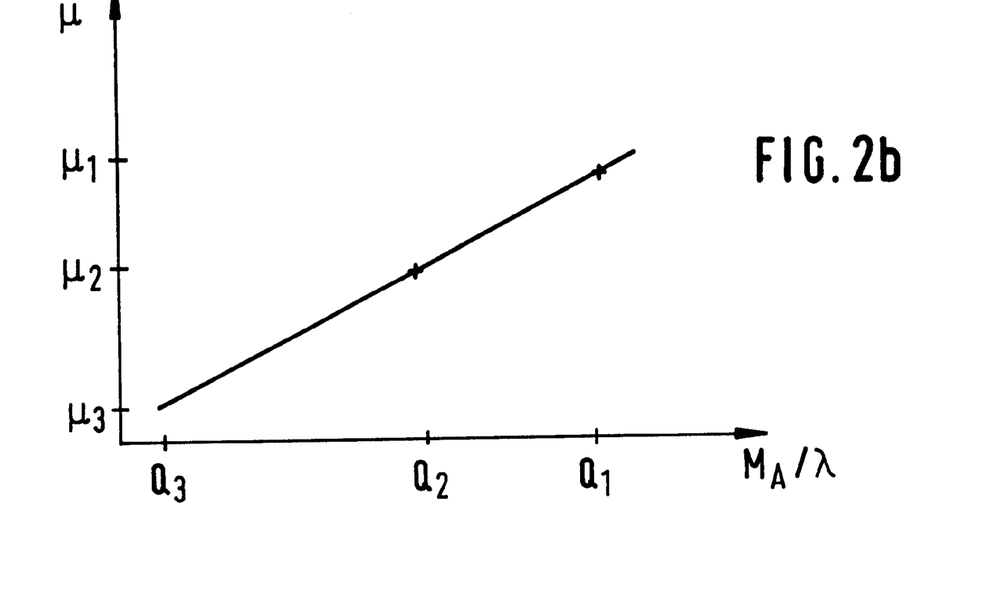
FIG. 2b is a plot of coefficient of friction versus $MA/_{80}$.

Conventional procedures are used to determine the average speed of the vehicle, the average slip value $\lambda$ in block 114 and, if appropriate, the acceleration in block 122. The procedure for determining the load-dependent coefficient of friction $\lambda_L$ in the block 112 has been described above. In order to determine the slip-dependent coefficient of friction $\mu_s$ in block 108, one of the straight lines illustrated in FIG. 2a is selected from the quotient of the drive torque MA and slip $\lambda$, which straight line is characterized by its intersection points to with the axis and gradient a. The slip-dependent coefficient of friction then results from the following formula:

$$\mu_s = b + a*(MA-MWBR)/(\lambda-\lambda erf)$$

($\mu s$ is the slip-dependent coefficient of friction, b is the section of the axis, a is the gradient of the selected straight line, MA is the actual drive torque, MWBR is the acceleration resistance torque, $\lambda$ is the actual slip, $\lambda$erf is the increased slip requirement)

This slip-dependent coefficient of friction $\mu s$ is evaluated by the traction controller 132 in order to determine the rebound in the torque. The maximum drive torque MAmax which can be transmitted then results from the product of this coefficient of friction and a constant factor which is selected in accordance with the driving situation (MAmax= $\mu s$*constant).

Constant factors for traveling straight ahead and for traveling through bends and entering bends, respectively with a high or low coefficient of friction are prescribed experimentally (when the vehicle begins to become unstable, which is detected by comparing the sum of the interfering moments (equivalent mass) with a prescribed limit value). When traveling through a bend, the difference between the traveling speeds of the nondriven wheels is detected and compared with a limit value. If the difference exceeds this limit value, it is detected that the vehicle is traveling through a bend and an appropriate constant factor is prescribed. The constant factors are lowered if the coefficient of friction lies below a limit value. Here, the constant factor for traveling straight ahead is greater than that for entering a bend. This is in turn greater than that for entering a bend at low coefficients of friction (and when the vehicle is beginning to become unstable), which is greater than the constant factor when traveling through a bend. This is in turn greater than the factor when traveling through a bend at a low coefficient of friction (and when the vehicle is beginning to become unstable).

The specific maximum drive torque which can be transmitted is set, as a function of the identified coefficient of friction $\mu_s$, preferably at the start of the actual traction control if excessive slip has been detected at the drive wheels.

The slip-dependent coefficient of friction $\mu s$ is dependent on the travel speed $V_{FIG}$ and the types of tires used. The travel speed dependence is represented in the publication by Heiner Bubb, page 33, FIG. 5. As the travel speed increases, with winter tires or with summer tires with a soft tread mixture, an overproportional behavior between the slip requirement and the vehicle speed is apparent. In these cases, $\mu_s$ generally decreases and the slip requirement $\lambda_{erf}$ increases as the travel speed increases. Therefore, the travel speed is conducted to the calculation block 126 via the line 124. The travel speed is compared with a prescribed threshold value by means of which the dependence of the slip requirement on the travel speed, which is described in approximate terms, can be prescribed. For travel speed ranges above or below a threshold value of the travel speed, two different travel speed-dependent straight lines with different gradients are prescribed for the increased slip requirement $\lambda$erf. These straight lines are determined experimentally. If, for example, the travel speed exceeds the threshold value, the system is switched over to a straight-line equation with an increased gradient. For increased slip requirement as a result of the tire mixture which occurs in particular with winter tires on roads with a high coefficient of friction and which increases as the temperature rises, the following procedure is carried out. In the calculation block 146, the calculated, slip-dependent coefficient of friction $\mu_L$ is compared with the load-dependent coefficient of friction $\mu_L$ which was identified on the basis of the drive torque MA. If the slip-dependent coefficient of friction drops below the load-dependent coefficient of friction, a time counter is started. If the latter reaches its maximum value and if the slip-dependent coefficient of friction continues to be smaller than the load-dependent coefficient of friction, a marker for the increased slip requirement is set and this marker is conducted to the calculation block 126. By setting the marker, the gradient of the prescribed speed-dependent straight-line equations is also switched over in a speed-dependent way. This procedure is based on the knowledge that when there is an increased slip requirement the drive torque is opposed by an excessively large slip and thus the calculated slip-dependent coefficient of friction drops to excessively small values. This behavior characterizes an increased slip requirement. In this way, the calculated coefficient of friction is corrected in accordance with the actual physical coefficient of friction. The filtering is also carried out preferably with a PT1 element. In accordance with the speed-dependent straight-line equations, a second pair of speed-dependent straight-line equations, which also have different gradients depending on the speed, is prescribed for the state with increased slip requirement.

Figure 4A:
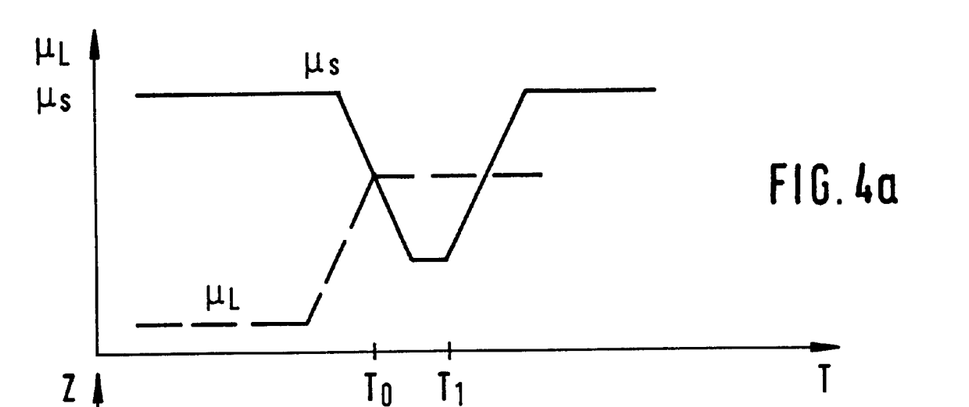
FIG. 4a is a time plot of the slip dependent and load dependent coefficients of friction.
Figure 4B:
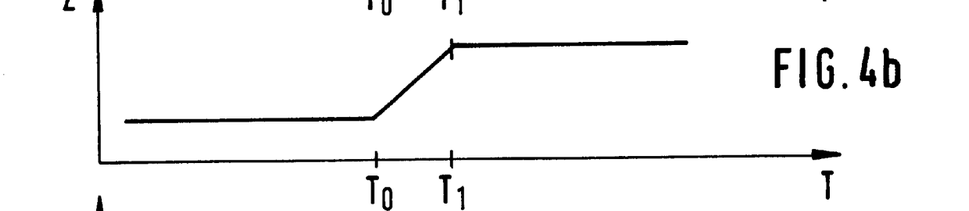
FIG. 4b is a time plot of the comber.
Figure 4C:
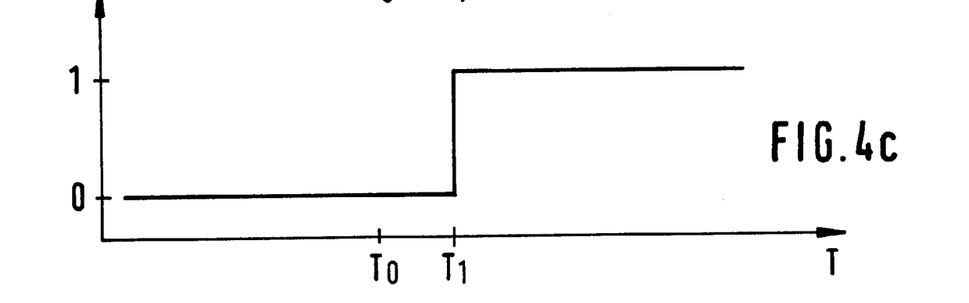
FIG. 4c is a time plot of the correction time.

The corresponding procedure is illustrated by means of time diagrams in FIG. 4 by way of example. FIG. 4a shows the time-dependent variation of the slip-dependent coefficient of friction (continuous line) and of the load-dependent coefficient of friction (broken line). Before the time T0, the load-dependent coefficient of friction is increased by the drive torque being increased by the driver. As a result of the, for example excessively soft, tread mixture and the excessively large drive torque, the calculated slip-dependent coefficient of friction drops until, at the time T0, it becomes smaller than the load-dependent coefficient of friction. At this time, according to FIG. 4b, the time counter is started. The latter reaches a maximum value at the time T1, the slip-dependent coefficient of friction having remained smaller than the load-dependent one. At this time, the marker is set according to FIG. 4c and the slip-dependent coefficient of friction $\mu_L$ is corrected so that it essentially corresponds to the physical one again.

Figure 5:
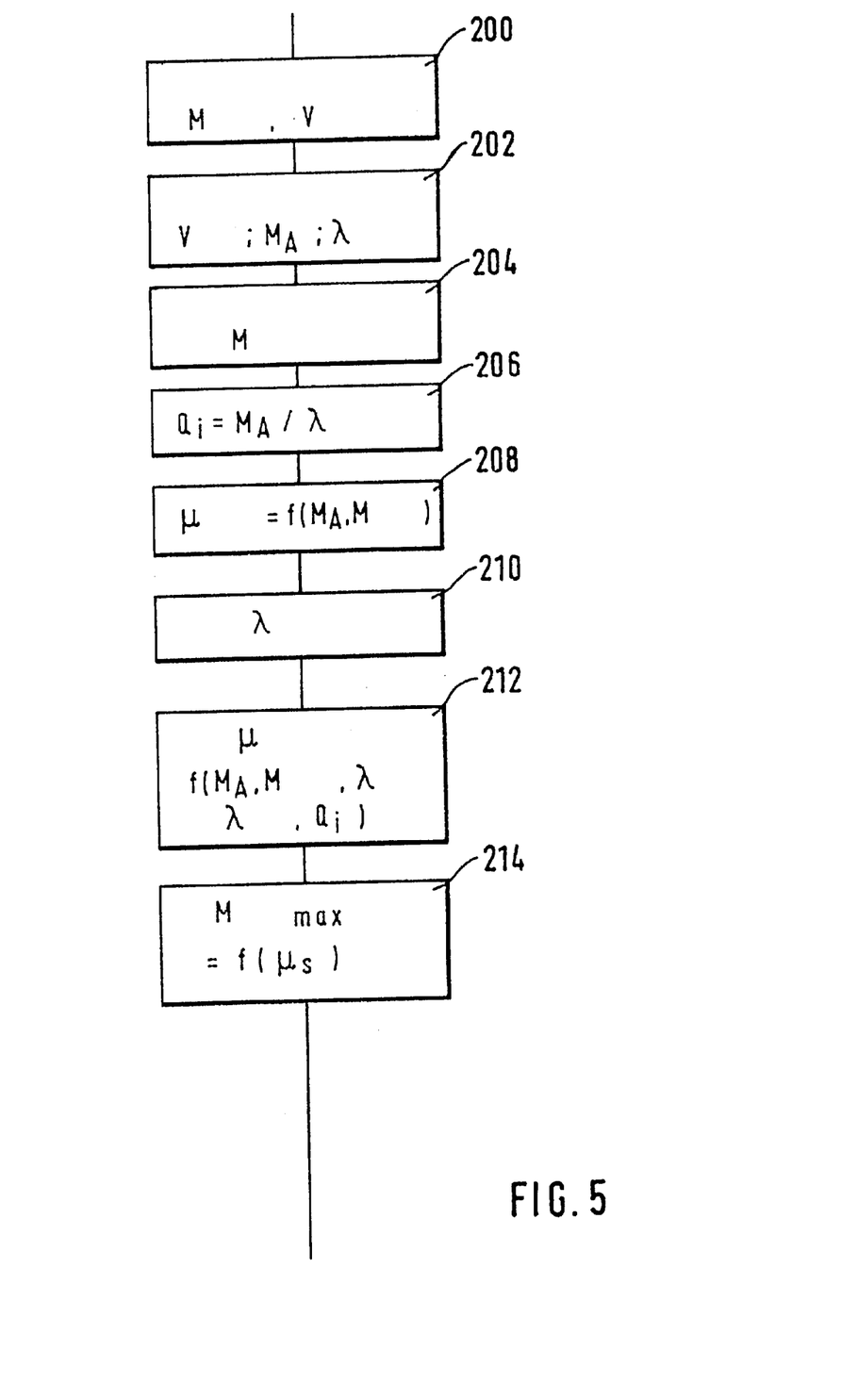
FIG. 5 is a computer flow diagram for determining maximum engine torque from actual engine torque.
Figure 6:
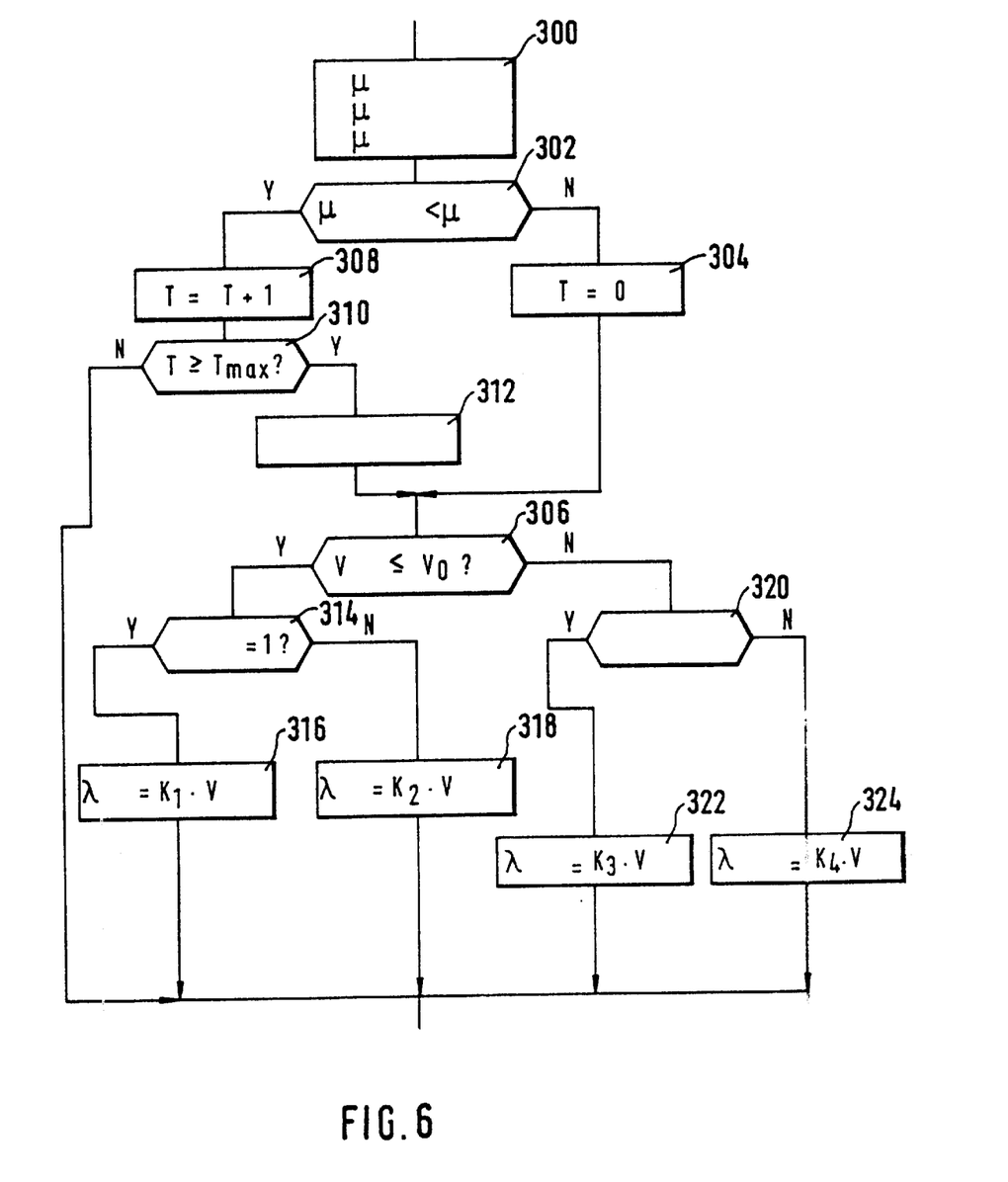
FIG. 6 is a computer flow diagram for determining the increased slip requirement.

The illustrated procedure is outlined in FIGS. 5 and 6 as a flow diagram. Here, FIG. 5 shows the calculation of the maximum drive torque which can be transmitted while the procedure for determining the increased slip requirement $\lambda$erf is outlined in FIG. 6.

After the part of the program illustrated in FIG. 5 has started at prescribed times, in the first step 200 the wheel speeds vrad and the actual engine torque Mmot are read in. In the subsequent step 202, the average vehicle speed vfzg, the drive torque MA and the average actual slip $\lambda$act are calculated. In the subsequent step 204, the acceleration resistance torque MWBR is calculated, and in the subsequent step 206 the quotient Q is formed from the drive torque MA and actual slip $\lambda$act. Subsequently, in step 208 the load-dependent coefficient of friction $\mu_L$ is calculated, as illustrated above, as a function of the drive torque MA and of the acceleration resistance torque MWBR, and in step 210 the additional slip requirement $\lambda$erf which is identified in accordance with the procedure according to FIG. 6 is read in. Subsequently, in step 212 the slip-dependent coefficient of friction $\mu$s is formed as a function of the drive torque MA, the acceleration resistance torque MWBR, the actual slip of the additional slip requirement and the quotient of the drive torque and actual slip. Subsequently, according to step 214 the maximum drive torque MAmax or engine torque Mmatmax which can be transmitted is formed on the basis of the slip-dependent coefficient of friction and of the prescribed constant factor, as illustrated above, and the part of the program is terminated.

Here, too, the actual adjustment of the slip to a desired slip value when a tendency of the drive wheels to spin occurs has not been illustrated for the sake of clarity.

The part of the program which is illustrated in FIG. 6 serves to identify the additional slip requirement which is read in in step 210. After this part of a program has started at prescribed times, in a first step 300 the current values of the load-dependent coefficient of friction, the slip-dependent coefficient of friction and the average vehicle speed are read in. Subsequently, in step 302 it is tested whether the slip-dependent coefficient of friction is smaller than the load-dependent coefficient of friction. If this is not the case, according to step 304 the counter T is set to 0 and in the subsequent inquiry step 306 the average speed of the vehicle $V_{FIG}$ is compared with a prescribed limit value v0. If the result of step 302 was that the slip-dependent coefficient of friction $\mu$s is smaller than the load-dependent coefficient of friction $\mu_L$, the counter T is increased by 1 in step 308 and an inquiry as to its maximum value Tmax is made in the subsequent inquiry step 310. If the counter is below its prescribed maximum value, the part of the program is terminated and started again at prescribed times. If the counter has reached its maximum value, in step 312 the marker is set to 1 for an increased slip requirement and the system proceeds with step 306. The filter function illustrated above is realized by means of the illustrated incrementing of the counter according to steps 308 and 310.

In step 306 it is tested whether the average speed of the vehicle is lower than or equal to the prescribed threshold value v0. If this is the case, in the subsequent step 314 it is tested whether the marker has been set to the value 1. This leads, in step 316, to the additional slip requirement $\lambda$erf being identified as a function of the speed of the vehicle $V_{FIG}$ using a first proportionality constant K1. Afterwards, the part of the program is terminated.

If the result of step 304 is that the marker does not have the value 1, in step 318 the additional slip requirement is determined as a function of the speed of the vehicle using a proportionality constant K2 and the part of the program is terminated.

Analogously, if the speed of the vehicle according to step 306 exceeds the threshold value and if the marker has the value 1 according to step 320, the additional slip requirement is calculated in step 322 as a function of the speed of the vehicle using the proportionality constant K3. If the marker is not 1 in this operating state, according to step 324 the additional slip requirement is obtained as a function of the speed of the vehicle using the proportionality constant K4.

It holds generally that the constant K3 is larger in absolute value than the constant K1 and this is in turn larger than the constant K4. The constant K2 is the smallest in absolute value.

The part of the program illustrated in FIG. 6 merely illustrates the setting of the marker to the value 1, that is to say the identification of the increased slip requirement. Resetting the marker to the value 0, that is to say rescinding the increased slip requirement, can be realized in different ways. It has become apparent that automatic initialization of the marker with the value 0 at the start of each operating cycle with "ignition on" is sufficient. Another advantageous way of resetting the marker to the value 0 results from an excessively large traction control deviation of the traction controller which occurs if the slip-dependent coefficient of friction is too inaccurate as a result of the increased slip requirement which has been set.

What is claimed is:

1. Traction control system for a vehicle having an engine which transmits drive torque MA to driven wheels, said driven wheels contacting a road surface having a coefficient of friction $\mu_s$, said system comprising:

means for determining a slip value $\lambda$ of at least one driven wheel on the basis of a detected speed of said at least one driven wheel;

means for determining the coefficient of friction $\mu_s$ between said at least one driven wheel and said road surface as a function of said slip value $\lambda$;

means for determining a maximum drive torque MAmax that can be transmitted as a function of the coefficient of friction $\mu_s$; and means for controlling the engine so that the drive torque MA does not exceed the maximum drive torque MAmax.

2. Traction control system as in claim 1 further comprising means for determining whether the vehicle is travelling in a bend, said maximum drive torque MAmax being determined as a function of whether the vehicle is travelling in a bend and said coefficient of friction $\mu_s$.

3. Traction control system as in claim 2 wherein said maximum drive torque MAmax is determined as a function of $\mu_s$ and a constant, said constant being dependent on one of travelling straight ahead, entering a bend, or travelling through a bend.

4. Traction control system as in claim 1 further comprising means for determining when said vehicle is unstable, said maximum drive torque MAmax being determined as a function of whether said vehicle is unstable and said coefficient of friction $\mu_s$.

5. Traction control system as in claim 1 further comprising means for determining an increased slip requirement $\mu_{erf}$, said slip dependent coefficient of friction $\mu_s$ being determined as a function of $\lambda$ and $\lambda_{erf}$.

6. Traction control system as in claim 5 wherein $\mu_s$ is a function of the quotient MA/$(\lambda-\lambda_{ERF})$.

7. Traction control system as in claim 5 further comprising means for determining a load dependent coefficient of friction $\mu_L$ as a function of the drive torque MA, said increased slip requirement $\lambda_{erf}$ being determined when $\mu_L$ exceeds $\mu_s$ for a prescribed time.

8. Traction control system as in claim 7 wherein $\mu_s$ is determined as a function of $\lambda$, $\lambda_{erf}$, and $V_{FZG}$.

9. Traction control system as in claim 8 wherein $\mu_s$ is further dependent on tire composition.

10. Traction control system as in claim 5 further comprising means for determining the speed of the vehicle $V_{FZG}$, said increased slip requirement $\lambda_{erf}$ being dependent on $V_{FZG}$.

11. Traction control system as in claim 1 further comprising means for determining when there is a tendency of the drive wheels to spin, said drive torque MA being influenced so that $\lambda$ is adjusted to a prescribed value when there is a tendency of the drive wheels to spin.

12. Traction control system as in claim 1 further comprising means for determining when the vehicle is entering a bend, said maximum drive torque MAmax being determined as a function of $\mu_s$ when it is determined that the vehicle is entering a bend.

13. Traction control system as in claim 12 wherein said vehicle has non-driven wheels, said system further comprising means for determining speeds of the non-driven wheels, the determination of when said vehicle enters a bend being based on the speeds of the non-driven wheels.

* * * * *